(12) United States Patent
Pinarbasi

(10) Patent No.: US 6,282,068 B1
(45) Date of Patent: Aug. 28, 2001

(54) ANTIPARALLEL (AP) PINNED READ HEAD WITH IMPROVED GMR

(75) Inventor: Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/280,498

(22) Filed: Mar. 30, 1999

(51) Int. Cl.$^7$ .......................................................... G11B 5/39
(52) U.S. Cl. .......................................................... 360/324.11
(58) Field of Search ........................... 360/324.11, 324.12

(56) References Cited

U.S. PATENT DOCUMENTS

| | | |
|---|---|---|
| 5,688,605 | 11/1997 | Iwasaki et al. . |
| 5,698,335 | 12/1997 | Iwasaki et al. . |
| 5,701,223 * | 12/1997 | Fontana, Jr. et al. . |
| 5,702,832 | 12/1997 | Iwasaki et al. . |
| 5,738,946 | 4/1998 | Iwasaki et al. . |
| 5,742,458 | 4/1998 | Koike et al. . |
| 5,880,913 | 3/1999 | Gill . |
| 5,932,343 * | 8/1999 | Hayashi et al. . |
| 6,061,210 * | 5/2000 | Gill . |
| 6,117,569 * | 9/2000 | Lin et al. . |
| 6,122,150 * | 9/2000 | Gill . |

FOREIGN PATENT DOCUMENTS 0 758 783 A1    2/1997    (EP) .

* cited by examiner

*Primary Examiner*—Craig A. Renner
(74) *Attorney, Agent, or Firm*—Gray Cary Ware & Freidenrich; Ervin F. Johnston

(57) ABSTRACT

First and second antiparallel (AP) pinned layers of an AP pinned layer structure are cobalt iron (CoFe) which increases the GMR (magnetoresistive coefficient dr/R) of a spin valve sensor by 10% with improved magnetic stability over a spin valve sensor where the first and second AP pinned layers are cobalt (Co).

43 Claims, 7 Drawing Sheets

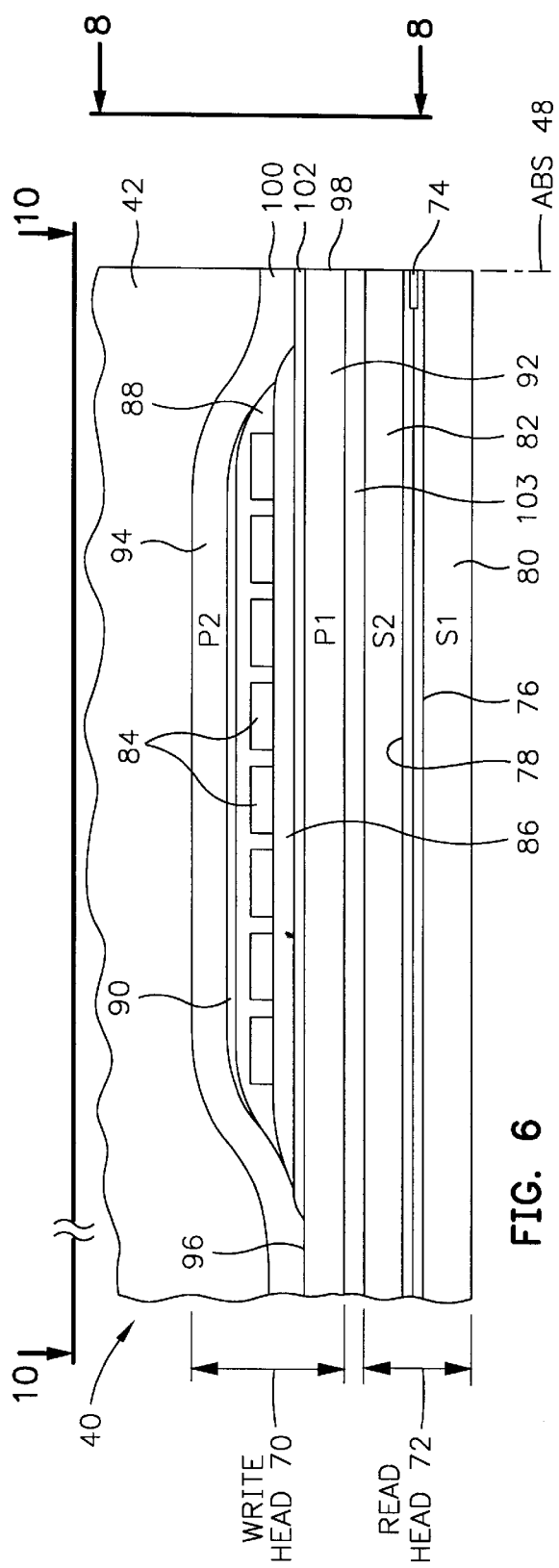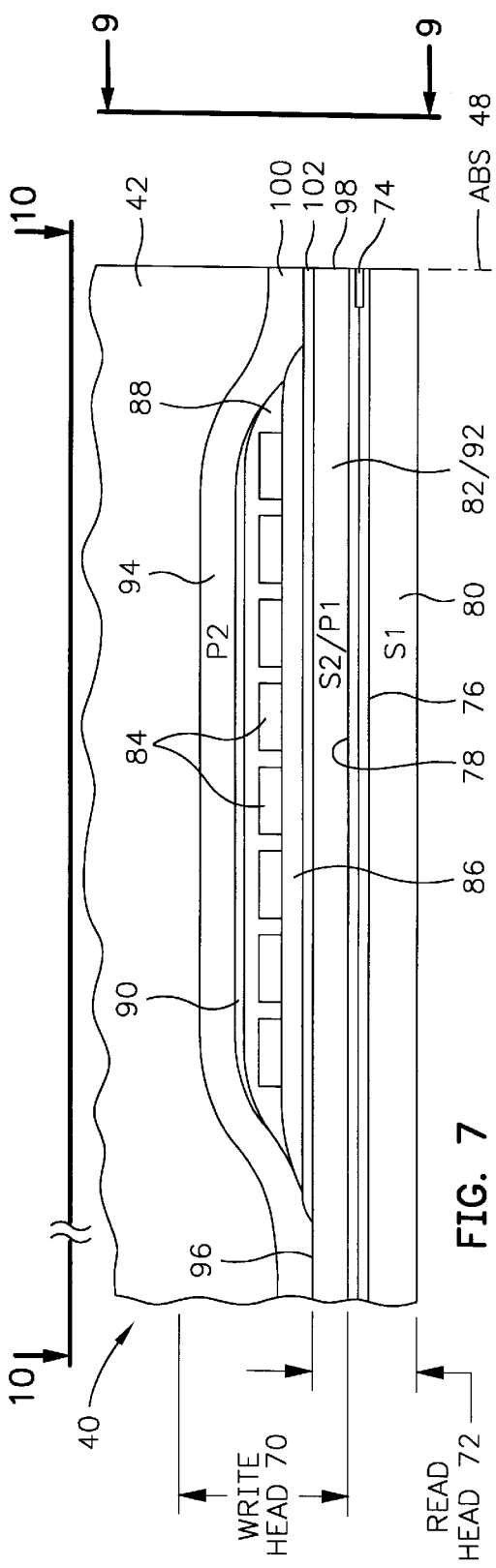

(ABS)

(ABS)

(ABS)

ANTIPARALLEL (AP) PINNED READ HEAD WITH IMPROVED GMR

BACKGROUND OF THE INVENTION

1. Field of the Invention

The present invention relates to an antiparallel (AP) pinned read head with improved giant magnetoresistance (GMR) and magnetic stability and more particularily to a read sensor having an AP pinned structure that promotes improved GMR and is magnetically stable when subjected to magnetic switching fields parallel to an air bearing surface (ABS) of the read head.

2. Description of the Related Art

The heart of a computer is an assembly that is referred to as a magnetic disk drive. The magnetic disk drive includes a rotating magnetic disk, write and read heads that are suspended by a suspension arm above the rotating disk and an actuator that swings the suspension arm to place the read and write heads over selected circular tracks on the rotating disk. The read and write heads are directly mounted on a slider that has an air bearing surface (ABS). The suspension arm biases the slider into contact with the surface of the disk when the disk is not rotating but, when the disk rotates, air is swirled by the rotating disk adjacent the ABS of the slider causing the slider to ride on an air bearing a slight distance from the surface of the rotating disk. When the slider rides on the air bearing the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a nonmagnetic gap layer at an air bearing surface (ABS) of the write head. The pole piece layers are connected at a back gap. Current conducted to the coil layer induces a magnetic field into the pole pieces that fringes across the gap between the pole pieces at the ABS. The fringe field or the lack thereof writes information in tracks on moving media, such as in circular tracks on a rotating disk.

In recent read heads a spin valve sensor is employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer, and a free layer. First and second leads are connected to the spin valve sensor for conducting a sense current therethrough. The magnetization of the pinned layer is pinned perpendicular to an air bearing surface (ABS) of the head and the magnetic moment of the free layer is located parallel to the ABS but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with the pinned and free layers. When the magnetizations of the pinned and free layers are parallel with respect to one another, scattering is minimal and when the magnetizations of the pinned and free layers are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor resistance changes cause potential changes that are detected and processed as playback signals by the processing circuitry.

The spin valve sensor is characterized by a magnetoresistive (MR) coefficient, also known as giant magnetoresistive (GMR), that is substantially higher than the MR coefficient of an anisotropic magnetoresistive (AMR) sensor. MR coefficient is dr/R were dr is the change in resistance of the spin valve sensor and R is the resistance of the spin valve sensor before the change. A spin valve sensor is sometimes referred to as a giant magnetoresistive (GMR) sensor. When a spin valve sensor employs a single pinned layer it is referred to as a simple spin valve.

Another type of spin valve sensor is an antiparallel (AP) spin valve sensor. The AP pinned spin valve sensor differs from the simple spin valve sensor in that the AP pinned spin valve sensor has an AP pinned structure that has first and second AP pinned layers instead of a single pinned layer. An AP coupling layer is sandwiched between the first and second AP pinned layers. The first AP pinned layer has its magnetic moment oriented in a first direction by exchange coupling to the antiferromagnetic pinning layer. The second AP pinned layer is immediately adjacent to the free layer and is antiparallel exchange coupled to the first AP pinned layer because of the minimal thickness (in the order of 8 Å) of the AP coupling layer between the first and second AP pinned layers. Accordingly, the magnetic moment of the second AP pinned layer is oriented in a second direction that is antiparallel to the direction of the magnetic moment of the first AP pinned layer.

The AP pinned structure is preferred over the single pinned layer because the magnetic moments of the first and second AP pinned layers of the AP pinned structure subtractively combine to provide a net magnetic moment that is less than the magnetic moment of the single pinned layer. The direction of the net moment is determined by the thicker of the first and second AP pinned layers. A reduced net magnetic moment equates to a reduced demagnetization (demag) field from the AP pinned structure. Since the antiferromagnetic exchange coupling is inversely proportional to the net pinning moment, this increases exchange coupling between the first AP pinned layer and the pinning layer. The AP pinned spin valve sensor is described in commonly assigned U.S. Pat. No. 5,465,185 to Heim and Parkin which is incorporated by reference herein.

The first and second AP pinned layers of the AP pinned structure are typically made of cobalt (Co). Unfortunately, cobalt has high coercivity, high magnetostriction and low resistance. When the first and second AP pinned layers of the AP pinned structure are formed they may be sputter deposited in the presence of a magnetic field that is oriented perpendicular to the ABS. This sets the easy axis (e.a.) of the pinned layers perpendicular to the ABS. During a subsequent making of the magnetic head, the AP pinned structure is subjected to magnetic fields that are directed parallel to the ABS. These fields can cause the magnetic moment of the first pinned layer to switch from a desirable first direction perpendicular to the ABS to an undesirable second direction antiparallel to the first direction. The same occurs to the second pinned layer of the AP pinned structure. If the coercivity of the first pinned layer of the AP pinned structure is higher than the exchange coupling between the first pinned layer and the pinning layer the exchange coupling will not return the magnetic moment of the first pinned layer to its original direction. This ruins the read head. The same problem can occur during operation of the magnetic head when a parallel magnetic field stronger than the coercivity of the first pinned layer of the AP pinned structure is exerted on the read head.

Still further, cobalt (Co) has a high negative magnetostriction. The negative sign determines the direction of any stress induced anisotropy. When a magnetic head is lapped, which is a grinding process to form the ABS, nonuniform compressive stresses occur in the layers of the sensor. Because of the magnetostriction and the compressive stress, the cobalt (Co) AP pinned layers of the AP pinned structure acquire a stress induced anisotropy that is parallel to the ABS. This is the wrong direction. The stress induced anisotropy may rotate the magnetic moment of the first and second pinned layers to some extent from perpendicular to the ABS in spite of the exchange coupling field tending to maintain the perpendicular position. This condition causes significant read signal asymmetry. Also, the low resistance of the cobalt (Co) pinned layers causes a portion of the sense current to be shunted past the free and spacer layers. This causes a loss of read signal.

Efforts continue to increase the spin valve effect of GMR heads. An increase in the spin valve effect equates to higher bit density (bits/square inch of the rotating magnetic disk) read by the read head. Accordingly, a search still continues to lower the coercivity, substantially eliminate magnetostriction and increase the resistance of some of the critical layers of the spin valve sensor, such as the pinned layers of an AP pinned structure.

SUMMARY OF THE INVENTION

I first investigated replacing first and second cobalt (Co) AP pinned layers of the AP pinned structure with first and second cobalt iron ($Co_{90}Fe_{10}$) pinned layers. The cobalt iron ($Co_{90}Fe_{10}$) pinned layers have lower coercivity, near zero magnetostriction and a higher resistance. The near zero magnetostriction means that the induced stress of the cobalt iron ($Co_{90}Fe_{10}$) layers after lapping the magnetic head will not cause a stress induced anisotropy field. This is because any stress induced anisotropy field is a product of magnetostriction and the induced stress. The higher resistance of the cobalt iron ($Co_{90}Fe_{10}$) pinned layers minimizes shunting of the sense current thereby increasing the read signal.

The coercivity of a cobalt iron $Co_{90}Fe_{10}$ first AP pinned layer of the AP pinned structure was still higher than the exchange coupling field between the first AP pinned layer and a nickel oxide (NiO) pinning layer. This is because the nickel oxide (NiO) pinning layer increases the coercivity of the first pinned layer. The coercivity $H_c$ of the first AP pinned layer was 500 oersteds (Oe) while the exchange coupling field between the nickel oxide (NiO) and the first AP pinned layer was only 450 Oe. Consequently, the exchange coupling field was not strong enough to overcome the coercivity and return the magnetic moment of the first AP pinned layer to its original direction after being switched to a direction antiparallel to the original direction.

By placing a nickel iron ($Ni_{80}Fe_{20}$) interlayer between the pinning layer and the first AP pinned layer of cobalt iron ($Co_{90}Fe_{10}$) the coercivity of the first AP pinned layer was significantly reduced from 500 Oe to 350 Oe. The exchange coupling field was also reduced from 450 Oe to 400 Oe. However, the coercivity of 350 Oe of the first AP pinned layer was less than the exchange coupling field of 400 Oe thereby permitting the pinning layer to return the magnetic moment of the first AP pinned layer to its original position when it is switched to the antiparallel direction by a magnetic field. Consequently the coercivity of the cobalt iron ($Co_{90}Fe_{10}$) second AP pinned layer is not affected by the nickel oxide (NiO) pinning layer and will be oriented by AP exchange coupling with the first AP pinned layer in a direction antiparallel to the direction of the magnetic moment of the first AP pinned layer. The present spin valve sensor also had an improved GMR.

An object of the present invention is to provide an antiparallel (AP) pinned read head that has improved GMR and is magnetically stable when subjected to magnetic fields oriented parallel to the ABS.

Another object is to provide an AP pinned read head wherein a first AP pinned layer of an AP pinned structure, which is exchange coupled to an antiferromagnetic (AFM) nickel (NiO) pinning layer, has coercivity that is less than the exchange coupling field between the first AP pinned layer and the pinning layer.

Other objects and advantages of the invention will become apparent upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
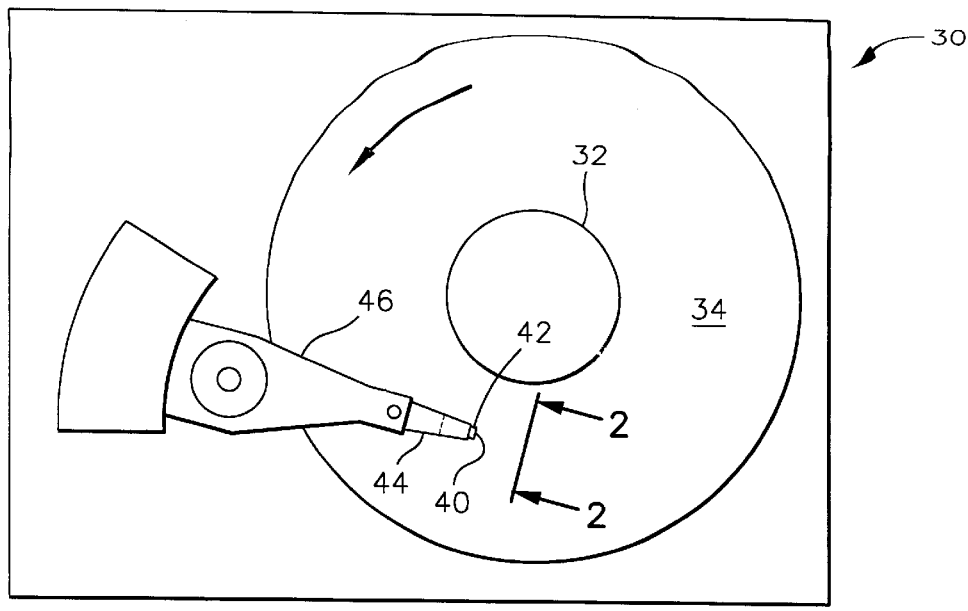
FIG. 1 is a plan view of an exemplary magnetic disk drive.
Figure 2:
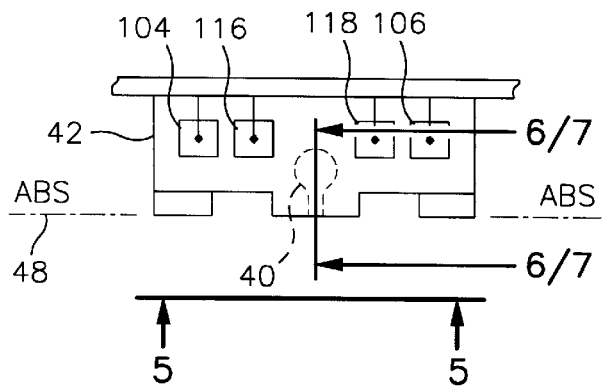
FIG. 2 is an end view of a slider with a magnetic head of the disk drive as seen in plane 2—2.
Figure 3:
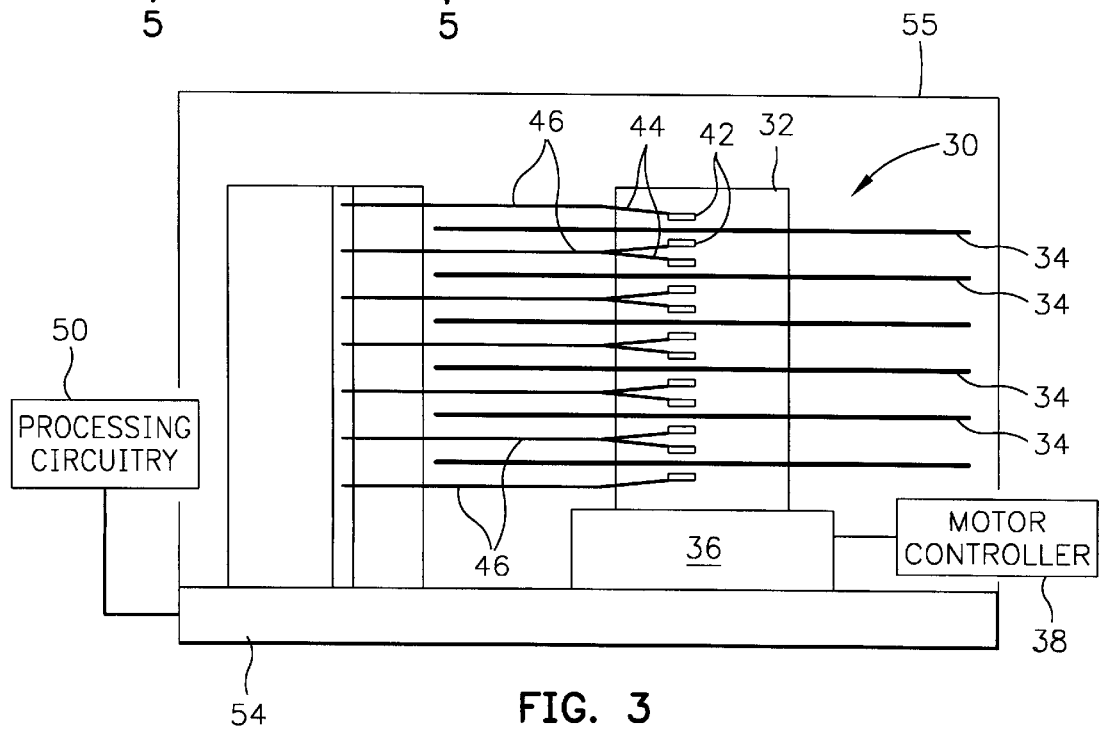
FIG. 3 is an elevation view of the magnetic disk drive wherein multiple disks and magnetic heads are employed.
Figure 4:
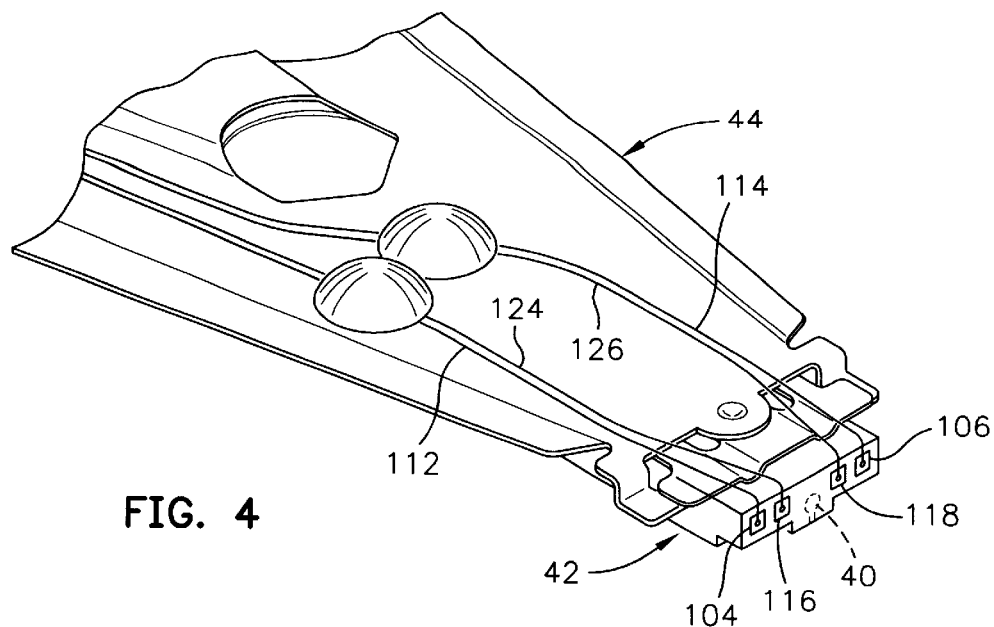
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a suspension 44. The components described hereinabove may be mounted on a frame 54 of a housing, ss as shown in FIG. 3.

Figure 5:
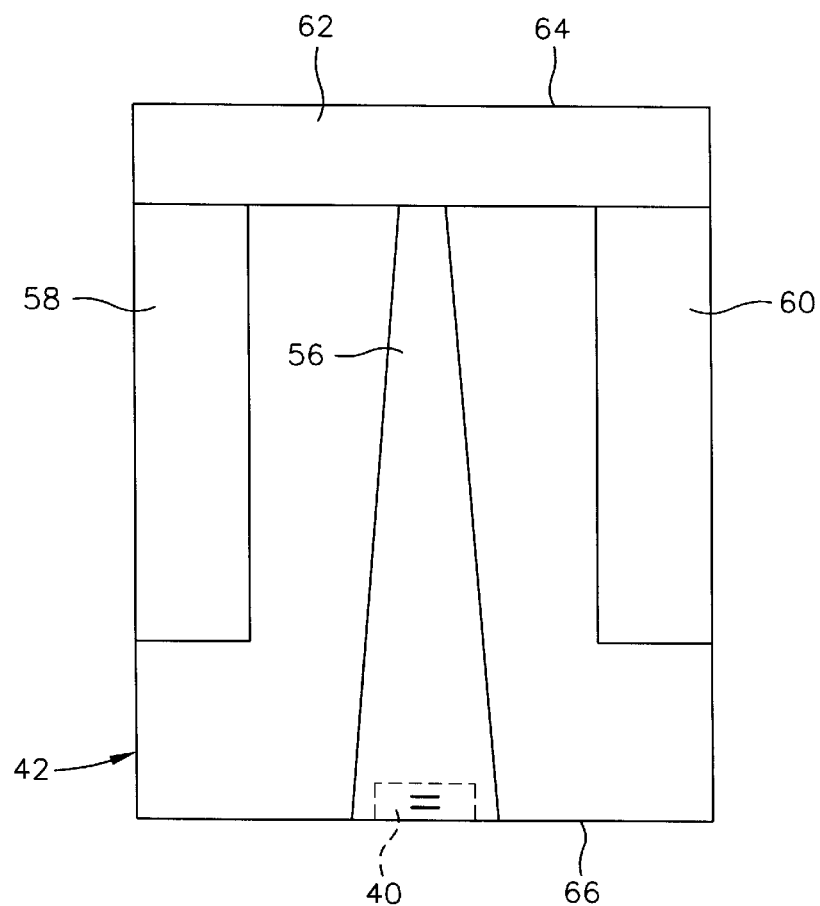
FIG. 5 is an ABS view of the magnetic head taken along plane 5—5 of FIG. 2.
Figure 10:
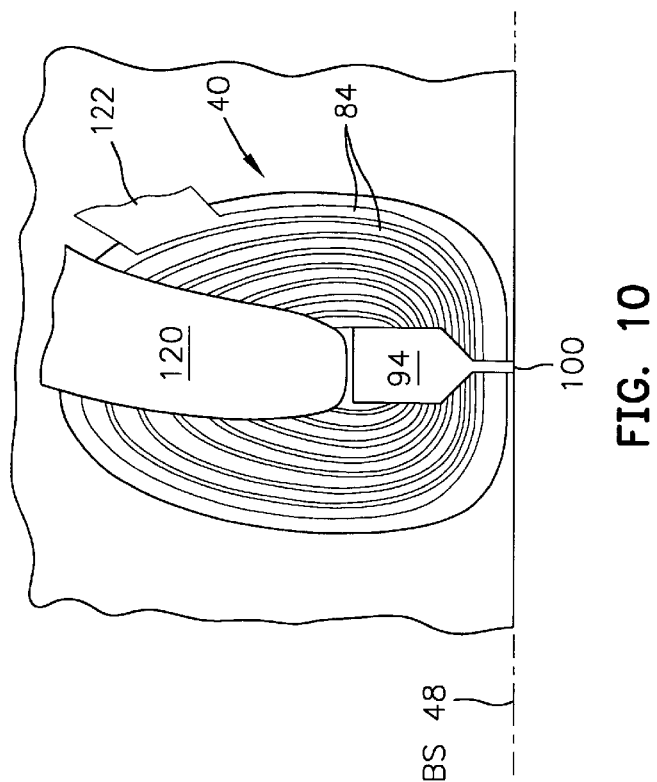
FIG. 10 is a view taken along plane 10—10 of FIGS. 6 or 7 with all material above the coil layer and leads removed.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
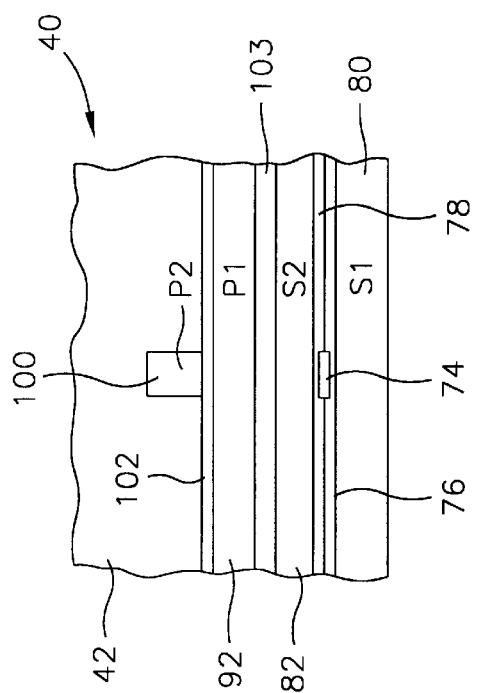
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing an AP pinned spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_s$ (not shown) conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
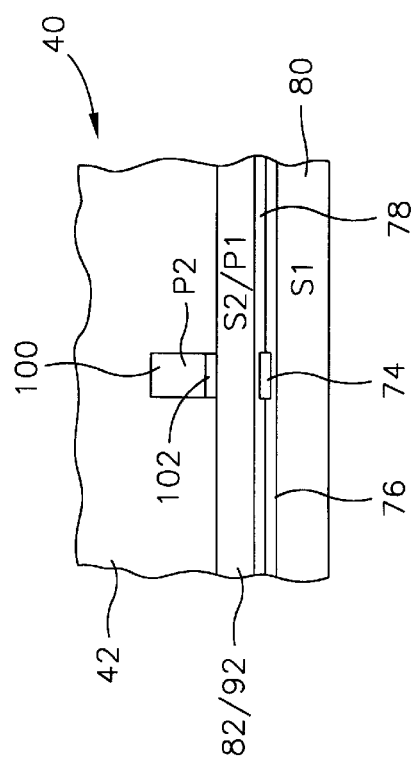
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
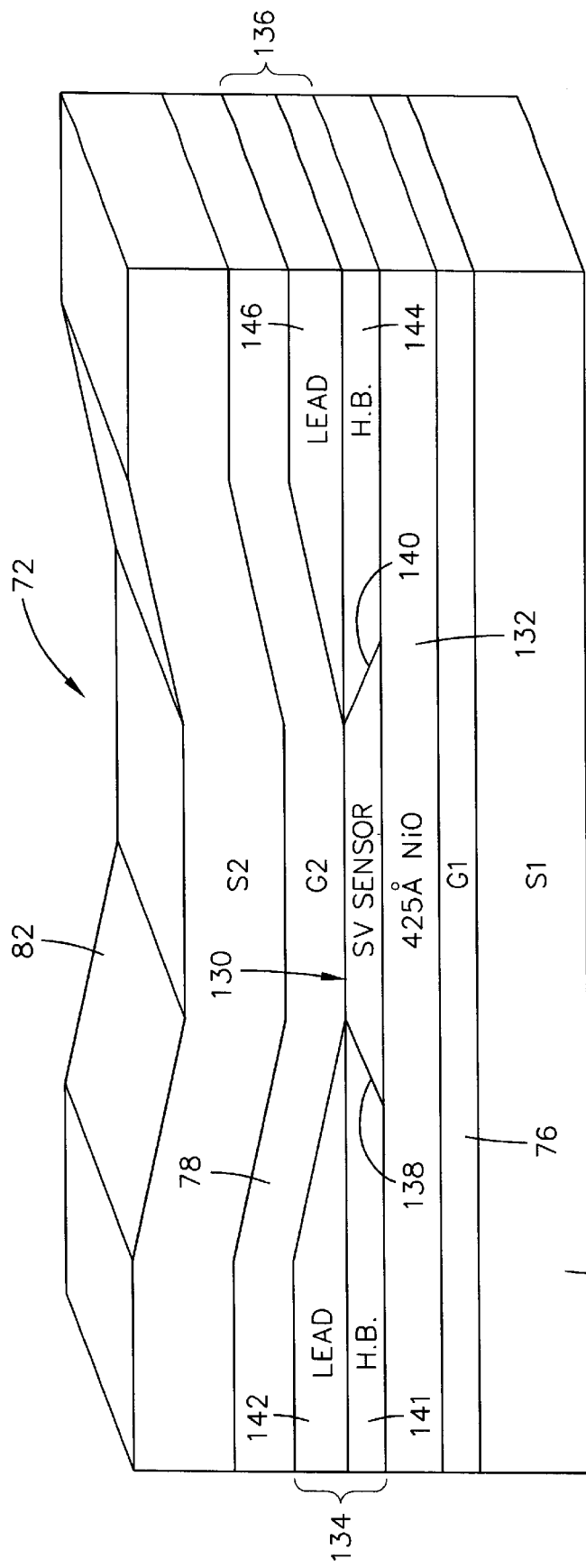
FIG. 11 is an isometric ABS illustration of a read head which employs an AP pinned spin valve (SV) sensor.

FIG. 11 is an isometric ABS illustration of the read head 72 shown in FIGS. 6 or 8. The read head 72 includes the present spin valve sensor 130 which is located on an antiferromagnetic (AFM) pinning layer 132. The spin valve sensor 130 has an AP pinned structure, to be described hereinafter, that has its magnetic moments pinned by the magnetic spins of the pinning layer 132. The AFM pinning layer is preferably 425 Å of nickel oxide (NiO). First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 141 and a first lead layer 142 and the second hard bias and lead layers 136 include a second hard bias layer 144 and a second lead layer 146. The hard bias layers 141 and 144 cause magnetic fields to extend longitudinally through the spin valve sensor 130 for stabilizing the magnetic domains therein. The AFM pinning layer 132, the spin valve sensor 130 and the first and second hard bias and lead layers 134 and 136 are located between the nonmagnetic electrically insulative first and second read gap layers 76 and 78. The first and second read gap layers 76 and 78 are, in turn, located between ferromagnetic first and second shield layers 80 and 82.

The Present Invention

Figure 12:
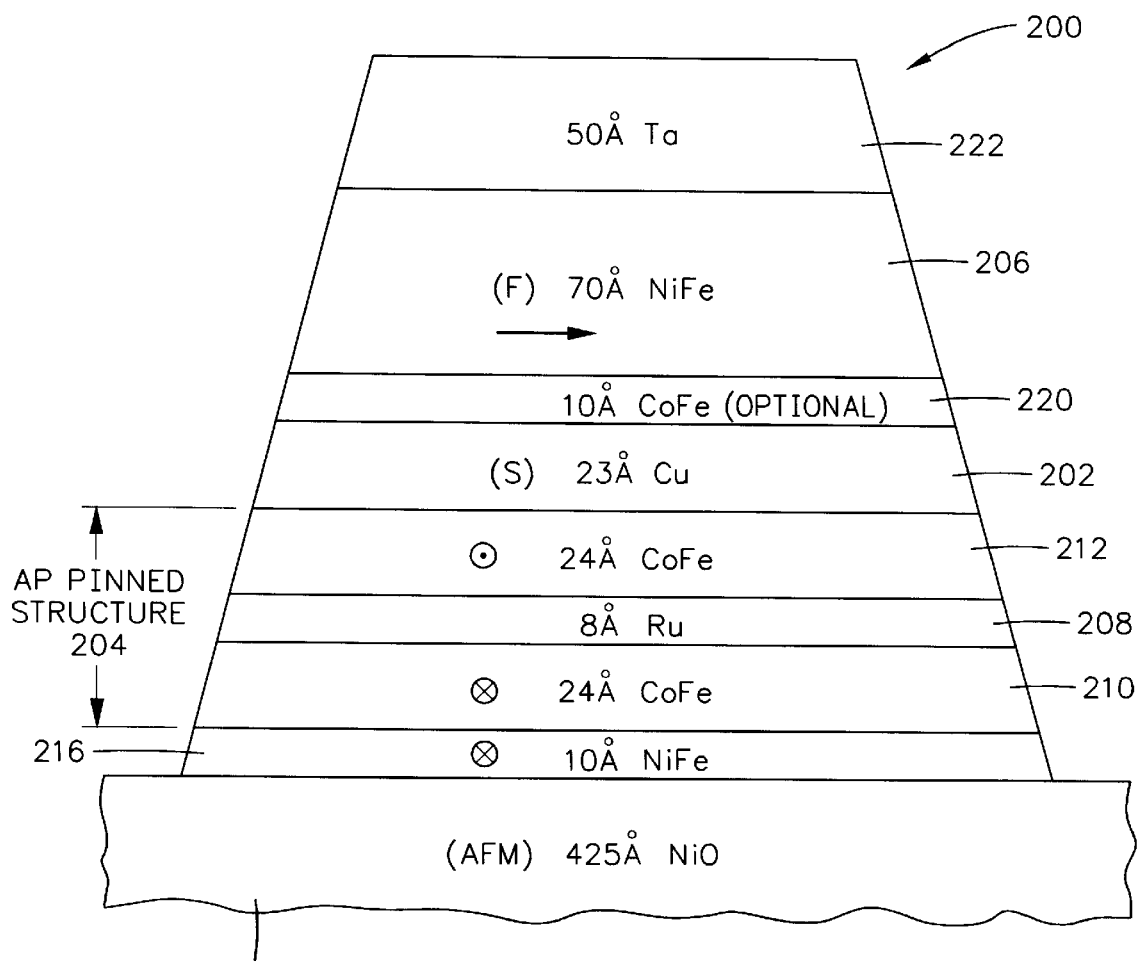
FIG. 12 is an ABS illustration of the present AP pinned spin valve sensor.

The present AP pinned structure 200 is illustrated in FIG. 12 which is a cross sectional view of the various layers of the AP pinned read sensor 130 as seen at the air bearing surface (ABS). The AP pinned sensor 200 includes a nonmagnetic electrically conductive spacer layer (S) 202 which is located between an antiparallel (AP) pinned structure 204 and a ferromagnetic free layer (F) 206. The AP pinned structure 204 includes an AP coupling layer 208 which is located between first and second AP pinned layers 210 and 212. In the present invention the first and second AP pinned layers 210 and 212 are cobalt iron (CoFe) in lieu of cobalt (Co). The cobalt iron (CoFe) of the first and second AP pinned layers 210 and 212 may be deposited in the presence of a field that is perpendicular to the ABS so that the easy axes of the first and second AP pinned layers 210 and 212 are oriented perpendicular to the ABS.

The magnetic moment of the first AP pinned layer 210 is pinned perpendicular to the ABS by the antiferromagnetic (AFM) pinning layer 132. The invention employs nickel oxide (NiO) for the pinning layer 132. Located between the pinning layer 212 and the first AP pinned layer 210 of the AP pinned structure 204 is an interlayer 216 of nickel iron (NiFe) which will be described in more detail hereinafter.

The magnetic spins of the pinning layer 132 are oriented perpendicular to the ABS which, by exchange coupling with the interlayer 216, causes a magnetic moment of the interlayer 216 to be oriented perpendicular to the ABS, such as away from the ABS as shown by the circle with an x in it (⊗). Because of exchange coupling between the interlayer 216 and the first AP pinned layer 210, the magnetic moment of the first AP pinned layer 210 is also oriented perpendicular to and away from the ABS as shown by ⊗. By antiparallel exchange coupling between the first and second AP pinned layers 210 and 212 the magnetic moment of the second AP pinned layer 212 is oriented antiparallel to the magnetic moment of the first AP pinned layer 210, namely perpendicular to and toward the ABS as shown by the circle with a dot in it (⊙). It should be understood that the magnetic spins of the pinning layer and the magnetic orientations of the magnetic moments of the interlayer 216 and the first and second AP pinned layers 210 and 212 may be reversed if desired. As shown by the arrow the magnetic moment of the free layer 206 is oriented parallel to the ABS, which direction may be either to the right or the left. It should be understood that the relative orientation between the magnetic moments of the second AP pinned layer 212 and the free layer 206 determines the change in resistance of the spin valve sensor 200 in response to applied signals from the rotating magnetic disk. For instance in the above example, when the magnetic moment of the free layer 206 rotates up and down from the parallel position to the ABS the magnetoresistance of the spin valve sensor decreases and increases respectively in response to positive and negative signals respectively from the rotating magnetic disk.

The nickel iron (NiFe) interlayer 216 reduces the coercivity $H_c$ of the first AP pinned layer 210. When the first AP pinned layer 210 of cobalt iron ($Co_{90}Fe_{10}$) directly interfaces the nickel oxide (NiO) pinning layer 132 its coercivity is 500 Oe while the exchange coupling between these two layers is only 450 Oe. Accordingly, if the magnetic moment of the first AP pinned layer 216 is switched from a direction perpendicular to and away from the ABS to an antiparallel position perpendicular to and toward the ABS the exchange coupling field of 450 Oe will not be great enough to overcome the coercivity $H_c$ of 500 Oe of the first AP pinned layer 216 to return it to its original position perpendicular to and away from the ABS. The result is a destruction of the read head. However, when the interlayer 216 of nickel iron $Ni_{80}Fe_{20}$ is employed between the nickel oxide (NiO) pinning layer 132 and the first AP pinned layer 210 of cobalt iron ($Co_{90}Fe_{10}$) the first AP pinned layer 210 has a reduced coercivity $H_c$ of 350 Oe while the exchange coupling field therebetween has been slightly decreased to 400 Oe. The exchange coupling field of 400 Oe is larger than the coercivity field of 350 Oe which causes the pinning layer 132 to return the magnetic moment of the first AP pinned layer 210 to its original position as shown by (x) after the magnetic moment of the first AP pinned layer 210 has been switched to an antiparallel direction.

In a preferred embodiment a GMR enhancement layer 220 of cobalt iron (CoFe) is located between and interfaces the spacer layer 202 and the free layer 206. It has been found that the GMR enhancement layer 220, which is sometimes referred to as a nanolayer, improves the dr/R ratio of the read head. The GMR enhancement layer is optional. A capping layer 222 of tantalum (Ta) is typically employed on top of the free layer 206 for its protection. Preferred thicknesses of the layers are the pinning layer 132 is 425 Å of nickel oxide (NiO), the interlayer 216 is from 4 Å to 30 Å and preferably 10 Å of nickel iron ($Ni_{80}Fe_{20}$), the first AP pinned layer 210 is from 10 Å to 50 Å and preferably 24 Å of cobalt iron (CoFe), the AP coupling layer 208 is 8 Å of ruthenium (Ru), the second AP pinned layer is from 10 Å to 50 Å and preferably 24 Å of cobalt iron ($Co_{90}Fe_{10}$), the spacer layer 202 is 23 Å of copper (Cu), the GMR enhancement layer 220 is from 3 Å to 30 Å and preferably 10 Å of cobalt iron ($Co_{90}Fe_{10}$), the free layer 206 is 70 Å of nickel iron ($Ni_{80}Fe_{20}$) and the capping layer 222 is 50 Å of tantalum (Ta). The cobalt iron is preferably $Co_{90}Fe_{10}$.

Comparison with Cobalt (Co) Pinned Layers

Figure 13:
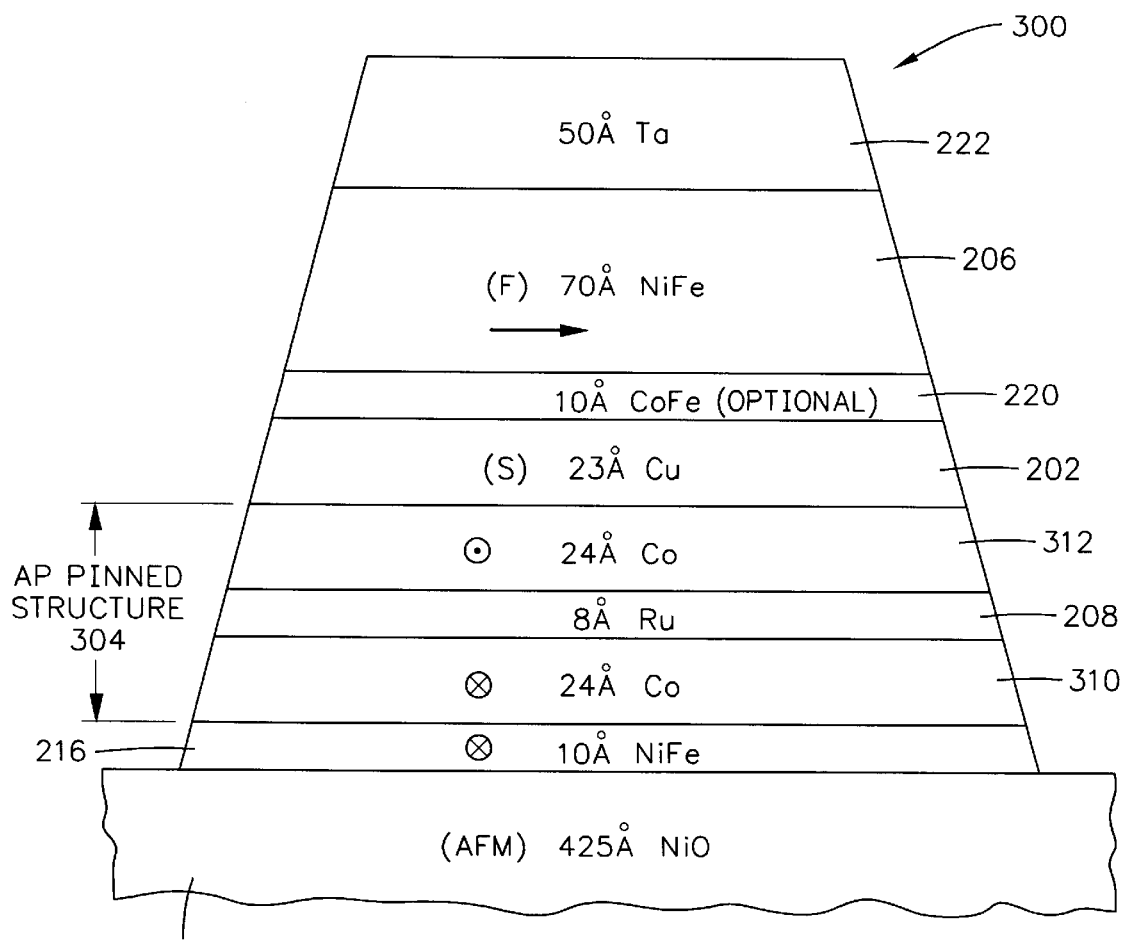
FIG. 13 is the same as FIG. 12 except cobalt (Co) is employed for the first and second pinned layers of the AP pinned structure instead of cobalt iron (CoFe) for comparison purposes.

The spin valve sensor 300 in FIG. 13 is the same as the spin valve sensor in 200 in FIG. 12 except the AP pinned structure 304 employs first and second AP pinned layers 310 and 312 that are made of cobalt (Co) in lieu of cobalt iron (CoFe). The remainder of the layers are of the same materials with the same thicknesses as that shown in FIG. 12. Each of the spin valve sensors 200 and 300 were tested first and second times, the first time being after deposition of the spin valve layers followed by a resetting of the nickel oxide pinning layer 214 and a second time after subjecting the spin valve sensor to 250° C. for a duration of 6 hours followed by another reset of the magnetic spins of the nickel oxide pinning layer 132. The resetting of the pinning layer 214, hereinafter referred to as nickel oxide (NiO) reset, subjects the spin valve sensor at the wafer level to 230° C. in a field of approximately 12,000 Oe perpendicular to the ABS for 5 minutes. This sets the magnetic spins of the nickel oxide (NiO) pinning layer 132 perpendicular to the ABS. The annealing of the read head at 250° C. for 6 hours simulates the baking of the photoresist layers of the insulation stack of the write head.

The following data regarding the spin valve sensors 200 and 300 in FIGS. 12 and 13 was without the optional nanolayer 220. After deposition of the spin valve sensor 300 shown in FIG. 13 and the nickel oxide reset, the dr/R of the read head 300 without the nanolayer 220 was 4.15%. After the read head was subjected to the annealing of 250° C. for 6 hours and another nickel oxide reset the dr/R dropped to 3.55%. This resulted in a 10% amplitude loss of read signal. After deposition of the spin valve sensor 200, shown in FIG. 12, and nickel oxide reset the dr/R without the nanolayer 220 was 4.6%, which is a 6% improvement over the spin valve sensor 300. After subjecting the spin valve sensor 200 to 250° C. for 6 hours and another nickel oxide reset, the dr/R was 4.01% which is still a 10% improvement over the dr/R of the spin valve sensor in 300 after its 250° C. annealing and nickel oxide reset. Accordingly, the spin valve sensor 200 in FIG. 12 demonstrated significant dr/R improvement over the dr/R of the spin valve sensor 300 in FIG. 13 when cobalt iron (CoFe) is employed for the first and second AP pinned layers 210 and 212 in lieu of cobalt (Co) for the first and second AP pinned layers 310 and 312 in FIG. 13.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:
1. A magnetic read head comprising:
   a spin valve sensor, the spin valve sensor including:
      a ferromagnetic free layer;
      a multi-layered antiparallel (AP) pinned structure;
      a nonmagnetic electrically conductive spacer layer located between the free layer and the AP pinned structure;
      an antiferromagnetic pinning layer; and
      the AP pinned structure being located between the pinning layer and the spacer layer; and
   the AP pinned structure including:
      first and second ferromagnetic AP pinned layers with the first AP pinned layer being pinned by exchange coupling with the pinning layer in a first direction;
      an antiparallel (AP) coupling layer located between the first and second AP pinned layers so that the second AP pinned layer is pinned by the first AP pinned layer in a second direction antiparallel to said first direction;

each of the first and second AP pinned layers being cobalt iron (CoFe);

an exchange coupling interlayer located between and interfacially engaging the pinning layer and the first AP pinned layer; and said exchange coupling interlayer being nickel iron (NiFe).

2. A magnetic read head as claimed in claim 1 wherein the spin valve sensor further includes:

a giant magnetoresistive (GMR) enhancement layer located between the second AP pinned layer and the free layer and interfacially engages the free layer; and the GMR enhancement layer being cobalt iron (CoFe).

3. A magnetic read head as claimed in claim 2 wherein the GMR enhancement layer has a thickness of substantially 10 Å.

4. A magnetic read head as claimed in claim 1 wherein the pinning layer is nickel oxide (NiO).

5. A magnetic read head as claimed in claim 4 wherein the pinning layer has a thickness of substantially 425 Å.

6. A magnetic read head as claimed in claim 4 wherein each of the first and second AP pinned layers has a thickness of substantially 24 Å.

7. A magnetic read head as claimed in claim 6 wherein the pinning layer has a thickness of substantially 425 Å.

8. A magnetic read head as claimed in claim 7 wherein the spin valve sensor further includes:

a giant magnetoresistive (GMR) enhancement layer located between the spacer layer and the free layer and interfacially engaging the free layer; and the GMR enhancement layer being cobalt iron (CoFe).

9. A magnetic read head as claimed in claim 8 wherein the GMR enhancement layer has a thickness in a range of 3 Å to 30 Å.

10. A magnetic read head as claimed in claim 9 wherein the AP coupling layer is ruthenium (Ru) with a thickness of substantially 8 Å.

11. A magnetic head assembly having a read head and a write head comprising:

the write head including:

first and second pole piece layers;

each of the first and second pole piece layers having a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions; and the read head including:

nonmagnetic electrically insulative first and second read gap layers;

a spin valve sensor;

first and second electrically conductive hard bias and lead layers connected to the spin valve sensor;

the spin valve sensor and the first and second hard bias and lead layers being located between the first and second read gap layers;

a first shield layer; and the first and second read gap layers being located between the first shield layer and the first pole piece layer;

the spin valve sensor including:

a ferromagnetic free layer;

a multi-layered antiparallel (AP) pinned structure;

a nonmagnetic electrically conductive spacer layer located between the free layer and the AP pinned structure;

an antiferromagnetic pinning layer; and the AP pinned structure being located between the pinning layer and the spacer layer;

the AP pinned structure including:

first and second ferromagnetic AP pinned layers with the first pinned layer being pinned by exchange coupling with the pinning layer in a first direction;

an antiparallel (AP) coupling layer located between the first and second AP pinned layers so that the second AP pinned layer is pinned in a second direction antiparallel to said first direction; and each of the first and second AP pinned layers being cobalt iron (CoFe); and an exchange coupling interlayer located between and interfacially engaging the pinning layer and the first AP pinned layer; and said exchange coupling interlayer being nickel iron (NiFe).

12. A magnetic head assembly as claimed in claim 11 wherein the pinning layer is nickel oxide (NiO).

13. A magnetic head assembly as claimed in claim 12 wherein the pinning layer has a thickness of substantially 425 Å.

14. A magnetic head assembly as claimed in claim 12 wherein each of the first and second AP pinned layers has a thickness of substantially 24 Å and the interlayer has a thickness of 10 Å.

15. A magnetic head assembly as claimed in claim 14 wherein the pinning layer has a thickness of substantially 425 Å.

16. A magnetic head assembly as claimed in claim 15 wherein the spin valve sensor further includes:

a giant magnetoresistive (GMR) enhancement layer located between the spacer layer and the free layer and interfacially engaging the free layer; and the GMR enhancement layer being cobalt iron (CoFe).

17. A magnetic head assembly as claimed in claim 16 wherein the GMR enhancement layer has a thickness in a range of 3 Å to 30 Å.

18. A magnetic head assembly as claimed in claim 17 wherein the AP coupling layer is ruthenium (Ru) with a thickness of substantially 8 Å.

19. A magnetic disk drive that includes at least one slider that has an air bearing surface (ABS), the slider supporting at least one magnetic head assembly that includes a read head and a write head, the disk drive comprising:

the write head including:

first and second pole piece layers;

each of the first and second pole piece layers having a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions; and the read head including:

nonmagnetic electrically insulative first and second read gap layers;

a spin valve sensor;

first and second hard bias and lead layers connected to the spin valve sensor;

the spin valve sensor and the first and second hard bias and lead layers being located between the first and second read gap layers;

a first shield layer;

the first and second read gap layers being located between the first shield layer and the first pole piece layer; and the spin valve sensor including:

a ferromagnetic free layer;

a multi-layered antiparallel (AP) pinned structure;

a nonmagnetic electrically conductive spacer layer located between the free layer and the AP pinned structure;

an antiferromagnetic pinning layer; and the AP pinned structure being located between the pinning layer and the spacer layer; and the AP pinned structure including:

first and second ferromagnetic AP pinned layers with the first AP pinned layer being pinned by exchange coupling with the pinning layer in a first direction;

an antiparallel (AP) coupling layer located between the first and second AP pinned layers so that the second AP pinned layer is pinned by the first AP pinned layer in a second direction antiparallel to said first direction; and each of the first and second AP pinned layers being cobalt iron (CoFe);

an exchange coupling interlayer located between and interfacially engaging the pinning layer and the first AP pinned layer; and said exchange coupling interlayer being nickel iron (NiFe);

a housing;

a magnetic disk rotatably supported in the housing;

a support mounted in the housing for supporting the magnetic head assembly with its ABS facing the magnetic disk so that the magnetic head assembly is in a transducing relationship with the magnetic disk;

means for rotating the magnetic disk;

positioning means connected to the support for moving the magnetic head assembly to multiple positions with respect to said magnetic disk; and processing means connected to the magnetic head assembly, to the means for rotating the magnetic disk and to the positioning means for exchanging signals with the magnetic head assembly, for controlling movement of the magnetic disk and for controlling the position of the magnetic head assembly.

20. A magnetic disk drive as claimed in claim 19 wherein the pinning layer is nickel oxide (NiO).

21. A magnetic disk drive as claimed in claim 20 wherein the pinning layer has a thickness of substantially 425 Å.

22. A magnetic disk drive as claimed in claim 20 wherein each of the first and second AP pinned layers has a thickness of substantially 24 Å and the interlayer has a thickness of 10 Å.

23. A magnetic disk drive as claimed in claim 22 wherein the pinning layer has a thickness of substantially 425 Å.

24. A magnetic disk drive as claimed in claim 23 wherein the spin valve sensor further includes:

a giant magnetoresistive (GMR) enhancement layer located between the spacer layer and the free layer and interfacially engaging the free layer; and the GMR enhancement layer being cobalt iron (CoFe).

25. A magnetic disk drive as claimed in claim 24 wherein the GMR enhancement layer has a thickness in a range of 3 Å to 30 Å.

26. A magnetic disk drive as claimed in claim 25 wherein the AP coupling layer is ruthenium (Ru) with a thickness of substantially 8 Å.

27. A method of making a magnetic read head comprising:

making a spin valve sensor as follows:

forming an antiferromagnetic (AFM) pinning layer;

forming an exchange coupling layer of nickel iron (NiFe) on the pinning layer;

forming a first an antiparallel (AP) pinned layer of cobalt iron (CoFe) directly on the exchange coupling layer;

forming an antiparallel (AP) coupling layer on the first AP pinned layer;

forming a second antiparallel (AP) pinned layer of cobalt iron (CoFe) on the AP coupling layer;

forming a nonmagnetic electrically conductive spacer layer on the second AP pinned layer; and forming a ferromagnetic free layer on the spacer layer.

28. A method of making a magnetic read head as claimed in claim 27 including:

forming a ferromagnetic first shield layer;

forming a nonmagnetic electrically insulative first read gap layer on the first shield layer;

forming said spin valve sensor on the first read gap layer;

forming first and second hard bias and lead layers in connection with the spin valve sensor;

forming a nonmagnetic electrically insulative second read gap layer on the spin valve sensor and the first and second hard bias and lead layers; and forming a ferromagnetic second shield layer on the second read gap layer.

29. A method of making a magnetic read head as claimed in claim 28 wherein the pinning layer is nickel oxide (NiO).

30. A method of making a magnetic read head as claimed in claim 29 wherein the pinning layer has a thickness of substantially 425 Å.

31. A method of making a magnetic read head as claimed in claim 29 wherein each of the first and second AP pinned layers has a thickness of substantially 24 Å and the exchange coupling layer has a thickness of 10 Å.

32. A method of making a magnetic read head as claimed in claim 31 wherein the pinning layer has a thickness of substantially 425 Å.

33. A method of making a magnetic read head as claimed in claim 32 wherein the spin valve sensor further includes:

a giant magnetoresistive (GMR) enhancement layer located between the spacer layer and the free layer and interfacially engaging the free layer; and the GMR enhancement layer being cobalt iron (CoFe).

34. A method of making a magnetic read head as claimed in claim 33 wherein the GMR enhancement layer has a thickness in a range of 3 Å to 30 Å.

35. A method of making a magnetic read head as claimed in claim 34 wherein the AP coupling layer is ruthenium (Ru) with a thickness of substantially 8 Å.

36. A method of making a magnetic head assembly having a read head and a write head comprising:

forming the read head as follows:

forming ferromagnetic first and second shield layers;

forming nonmagnetic electrically insulative first and second read gap layers between the first and second shield layers;

forming a spin valve sensor and first and second hard bias and lead layers between the first and second read gap layers;

the forming of the spin valve sensor including:

forming an antiferromagnetic (AFM) pinning layer on the first read gap layer;

forming an exchange coupling layer of nickel iron (NiFe) on the pinning layer;

forming a first AP pinned layer of cobalt iron (CoFe) directly on the exchange coupling layer;

forming an antiparallel (AP) coupling layer on the first AP pinned layer;

forming a second AP pinned layer of cobalt iron CoFe on the AP coupling layer;

forming a nonmagnetic electrically conductive spacer layer on the second AP pinned layer; and forming a ferromagnetic free layer on the spacer layer;

forming the write head as follows:

forming a ferromagnetic first pole piece layer on the second read gap layer wherein the first pole piece layer has a yoke region between a pole tip region and a back gap region;

forming a nonmagnetic write gap layer and an insulation stack with at least one write coil layer embedded therein on the first pole piece layer in the pole tip and yoke regions respectively; and forming a ferromagnetic second pole piece layer on the write gap layer and the insulation stack and connected to the first pole piece layer in the back gap region.

37. A method of making a magnetic head assembly as claimed in claim 36 wherein the pinning layer is nickel oxide (NiO).

38. A method of making a magnetic head assembly as claimed in claim 37 wherein the pinning layer has a thickness of substantially 425 Å.

39. A method of making a magnetic head assembly as claimed in claim 37 wherein each of the first and second pinned layers has a thickness of substantially 24 Å and the exchange coupling layer has a thickness of 10 Å.

40. A method of making a magnetic head assembly as claimed in claim 39 wherein the pinning layer has a thickness of substantially 425 Å.

41. A method of making a magnetic head assembly as claimed in claim 40 wherein the spin valve sensor further includes:

a giant magnetoresistive (GMR) enhancement layer located between the spacer layer and the free layer and interfacially engaging the free layer; and the GMR enhancement layer being cobalt iron (CoFe).

42. A method of making a magnetic head assembly as claimed in claim 41 wherein the GMR enhancement layer has a thickness in a range of 3 Å to 30 Å.

43. A method of making a magnetic head assembly as claimed in claim 42 wherein the AP coupling layer is ruthenium (Ru) with a thickness of substantially 8 Å.

* * * * *